United States Patent [19]
Ohtomo et al.

[11] Patent Number: 6,151,106
[45] Date of Patent: Nov. 21, 2000

[54] LASER IRRADIATION SYSTEM

[75] Inventors: Fumio Ohtomo; Kunihiro Hayashi, both of Tokyo-to, Japan

[73] Assignee: Kabushiki Kaisha TOPCON, Tokyo-to, Japan

[21] Appl. No.: 09/235,863

[22] Filed: Jan. 22, 1999

[30] Foreign Application Priority Data

Feb. 9, 1998 [JP] Japan .................................. 10-042877

[51] Int. Cl.⁷ .............................. B01C 3/08; B01B 11/26
[52] U.S. Cl. .................. 356/4.08; 356/141.4; 356/141.1
[58] Field of Search ............................ 356/141.1, 141.4, 356/4.08

[56] References Cited

U.S. PATENT DOCUMENTS

| | | |
|---|---|---|
| 3,588,249 | 6/1971 | Studebaker . |
| 3,846,026 | 11/1974 | Waters . |
| 4,326,799 | 4/1982 | Keene et al. . |
| 4,673,287 | 6/1987 | Rickus . |
| 5,198,877 | 3/1993 | Schulz . |
| 5,784,155 | 7/1998 | Ohtomo et al. ...................... 356/141.1 |

*Primary Examiner*—Stephen C. Buczinski
*Attorney, Agent, or Firm*—Nields & Lemack

[57] ABSTRACT

A laser irradiation system according to the present invention comprises a laser light emitter for emitting a laser beam, a rotator for irradiating the laser beam emitted from said laser light emitter by rotary irradiation and for forming a laser plane, a tilt setting unit for tilting said rotator and said laser plane, a photodetection unit integrated with said tilt setting unit for receiving a reflection laser beam reflected from a target which reflects the laser beam from said rotator as a reflection laser beam, wherein said photodetection unit comprises a photodetection element being long in a scanning direction of the laser beam.

9 Claims, 10 Drawing Sheets

LASER IRRADIATION SYSTEM

BACKGROUND OF THE INVENTION

The present invention relates to a laser irradiation system for irradiating laser beam by rotary irradiation and for forming a reference plane by the laser beam.

A laser irradiation system is used for irradiating the laser beam by rotary irradiation to a plane, which is regarded as a reference, and for forming a reference plane by the laser beam. When the laser beam scans across an object such as a wall surface, a locus of the laser beam serves as a reference line on the reference plane. Therefore, when the reference plane is a horizontal plane, the reference line runs in a horizontal direction, and the height of the reference line is equal to the height of the reference plane. Thus, the reference line is used as a reference for horizontality or height.

Visible light or invisible light is used as the laser beam irradiated from a laser irradiation system. In case visible light is used, the maximum output of the laser beam is restricted in order to ensure safety of the personnel such as operator. For this reason, in a laser irradiation system using visible light beam, stationary irradiation is performed toward a predetermined point or reciprocal scanning is performed within a predetermined range around a predetermined point in order to increase apparent luminance and to improve visibility and to facilitate visual confirmation. In some cases, there is provided a target for determining the predetermined point, and the laser irradiation system comprises the target and a rotary irradiation system main unit for irradiating the laser beam. The rotary irradiation system main unit used in this type of laser irradiation system has a function to detect the target, and the rotary irradiation system main unit is provided with a photodetection unit for detecting the reflection light beam from the target. The photodetection unit detects the reflection beam from the target and the position of the target is detected according to the result of the detection by the photodetection unit.

Description will be given below on a conventional type rotary irradiation system main unit 1 and a target 2 referring to FIG. 13 and FIG. 14.

The rotary irradiation system main unit 1 comprises a light emitter 5, a rotator 6, a photodetection unit 7, a control unit (CPU) 8, a light-emitting element driving unit 9, and a scanning motor driving unit 10.

First, the light emitter 5 will be described.

On an optical axis of a laser diode 11, which emits a laser beam 20, there are provided a collimator lens 12 and a perforated mirror 13 in this order as seen from the laser diode 11. The laser beam 20 emitted from the laser diode 11 is turned to parallel beams by the collimator lens 12, and the beams pass through the perforated mirror (or half-mirror) 13 and are projected toward the rotator 6.

The rotator 6 deflects the optical axis of the incident laser beam 20 coming from the light emitter 5 by 90° and projects the beam in a horizontal direction and further rotates it. The optical axis of the laser beam 20 coming from the light emitter 5 is deflected by an angle of 90° by means of a pentagonal prism 14. The pentagonal prism 14 is mounted on a rotation support 15, which is rotated around the optical axis of the light emitter 5. The rotation support 15 is connected to a scanning motor 18 via a scanning gear 16 and a driving gear 17. Rotating condition of the rotation support 15 is detected by an encoder 19 mounted on the rotation support 15, and a detection signal of the encoder 19 is inputted to the control unit (CPU) 8.

It is designed in such manner that a reflection laser beam 20' from the target 2 enters the rotator 6. When entering the pentagonal prism 14, the reflection laser beam 20' is deflected toward the perforated mirror 13, and the perforated mirror 13 reflects the reflection laser beam 20' toward the photodetection unit 7.

Next, the photodetection unit 7 will be described.

On a reflection optical axis of the perforated mirror 13, there are provided a condenser lens 21 and a photodetection element 22 in this order as seen from the perforated mirror 13, and photodetection status is outputted from the photodetection element 22 to a reflection light detecting unit 23, which is to be described below.

The reflection light detecting unit 23 detects the photodetection status of the reflection laser beam 20', i.e. the reflection status of the laser beam 20 at the target 2, and the detection status is outputted to the control unit 8. Now, description will be given on the control unit 8.

Signals from the encoder 19 and the reflection light detecting unit 23 are inputted to the control unit 8.

The control unit 8 drives the light-emitting element driving unit 9 and emits the laser beam 20. Further, it controls the scanning motor driving unit 10 based on the signal from the reflection light detecting unit 23. Based on the control signal from the control unit 8, the scanning motor driving unit 10 drives the scanning motor 18 and rotates the pentagonal prism 14 via the driving gear 17, the scanning gear 16, and the rotation support 15. Rotation status and rotating position of the pentagonal prism 14 are detected at the control unit 8 as the signal from the encoder 19 is fed back to the control unit 8. When the pentagonal prism 14 is rotated while the laser beam 20 is being emitted from the laser diode 11, the laser beam 20 projected in a horizontal direction is rotated, and a reference plane is formed by the laser beam 20.

The target 2 has a reflection surface, by which the target 2 is recognized as the target 2 when the laser beam 20 scans across the target 2, or/and by which it is possible to detect the center of the target 2. In the following, description will be given on the target 2 referring to FIG. 14(A) and FIG. 14(B).

Reflection layers 26 and 27 are provided on each of a base plate 25 respectively, and there is a non-reflection surface between the reflection layers 26 and 27. The reflection layer 27 reflects the laser beam 20 projected from the rotator 6 so that the laser beam 20 enters the rotatorc 6 again. Because there are provided two reflection layers, when the laser beam 20 scans across the target 2 as shown In FIG. 14(A), the reflection laser beam 20' from the target 2 is turned to two pulse-like forms with the middle portion lacking as shown in FIG. 14(B). Therefore, it is possible to identify the target 2 from the photodetection result.

After the target 2 was detected, the rotary irradiation system main unit 1 projects the laser beam 20 by reciprocal scanning within a predetermined range around the target 2.

In recent years, the scope of application of the laser irradiation system has been widened, and it is often necessary now to identify a target at a remote place. As described above, however, there is restriction on the maximum output of the laser beam. Accordingly, in order to identify a target at a remote place, the photodetection amount (light quantity) should be increased without loss. One of the means to increase the photodetection amount is to increase the size of the perforated mirror 13 of the photodetection system. This causes such problems that the optical system including the pentagonal prism 14 must be designed in larger size or that a driving system relating to the optical system must be designed larger.

SUMMARY OF THE INVENTION

It is an object of the present invention to provide a laser irradiation system, by which it is possible to increase photodetection amount of the reflection laser beam without designing optical system and driving system in larger size and to cope with the increasingly expanding scope of application for the laser irradiation system.

The present invention provides a laser irradiation system, which comprises a laser light emitter for emitting a laser beam, a rotator for irradiating the laser beam from the laser light emitter by rotary irradiation and for forming a laser plane, a tilt setting unit for tilting said rotator and said laser plane, a photodetection unit integrated with said tilt setting unit for receiving a reflection laser beam reflected from a target which reflects the laser beam from said rotator as a reflection laser beam, wherein said photodetection unit comprises a photodetection element being long in a scanning direction of the laser beam. The present invention also provides a laser irradiation system, which comprises a mask for limiting photodetection range on photodetection optical path of the reflection laser beam. Further, the present invention provides a laser irradiation system, in which the laser light emitter emits a polarized laser beam, the target comprises a polarization maintaining reflection sector for reflecting the laser beam while maintaining polarization direction and a polarization converting reflection sector for reflecting the laser beam while converting polarization direction, and the photodetection unit comprises first photodetection means for receiving a reflection laser beam with polarization direction maintained as before and second photodetection means for receiving a reflection laser beam with polarization direction converted. Further, the present invention provides a laser irradiation system, which comprises a rotating unit for rotating at least the tilt setting unit and the photodetection unit. Also, the present invention provides a laser irradiation system, which comprises control means for controlling rotation of the rotating unit in such manner that tilting direction of the tilt setting unit corresponds with tilting direction of the target based on photodetection result of the photodetection unit. Further, the present invention provides a laser irradiation system, which comprises display means for displaying correspondence in case setting direction of the tilt setting unit corresponds with the direction of the target based on photodetection result of the photodetection unit. Further, the present invention provides a laser irradiation system, which comprises control means for controlling the tilt setting unit so that the laser beam is directed toward the center of the target based on photodetection result of the photodetection unit. The present invention further provides a laser irradiation system, in which the photodetection unit comprises a polarization beam splitter, a first photodetection element for receiving one of the reflection laser beams split by the polarization beam splitter and a second photodetection element for receiving the other of the split reflection laser beams. Further, the present invention provides a laser irradiation system, in which the photodetection unit comprises a first polarizing plate, a second polarizing plate having polarization plane changed by 90' from the first polarizing plate, a first photodetection element for receiving the reflection laser beam passing through the first polarizing plate, and a second photodetection element for receiving the reflection laser beam passing through the second polarizing plate. In the reflection laser beam reflected by the target is received without passing through the rotator, the target is detected by the photodetection unit, and the target is recognized according to a signal from the photodetection unit and the center of the target is detested.

BRIEF DESCRIPTION OF THE DRAWINGS

FIG. 9(A) an FIG. 9(B) each represents a drawing to explain the function of the target;

FIG. 14 shows an example of the target.

DETAILED DESCRIPTION OF THE PREFERRED EMBODIMENTS

In the following, description will be given on embodiments of the present invention referring to the attached drawings.

Figure 1:
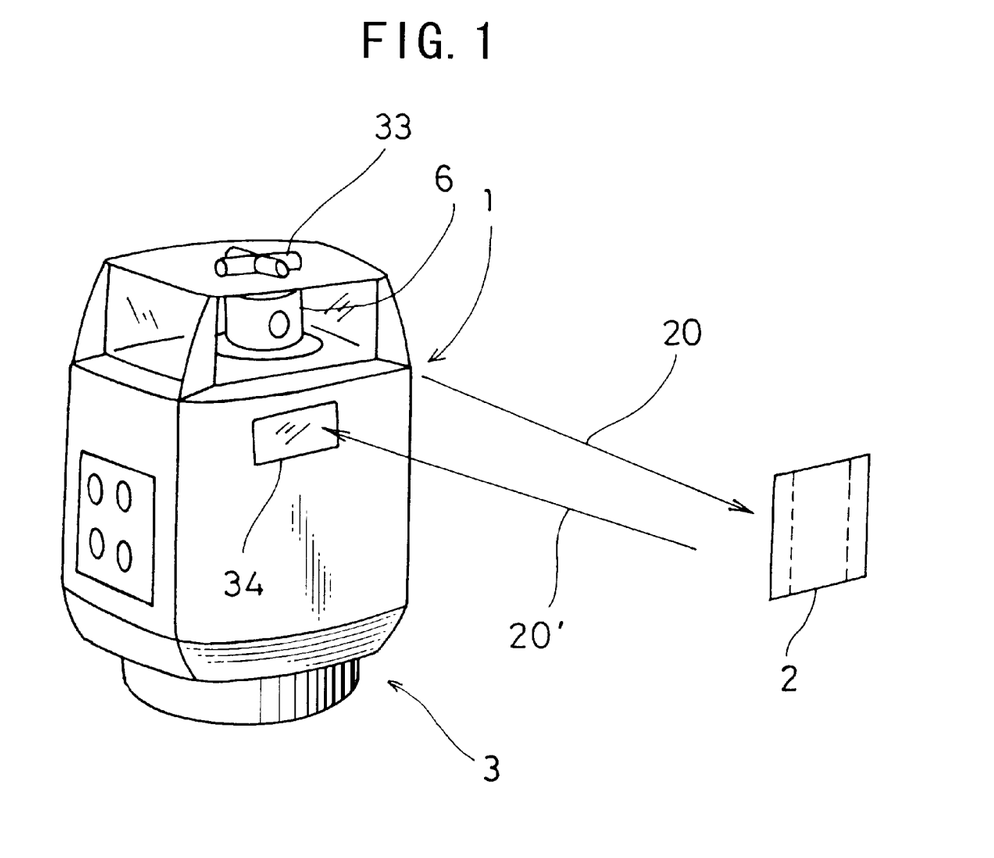
FIG. 1 is an external view of an embodiment of the present invention.
Figure 2:
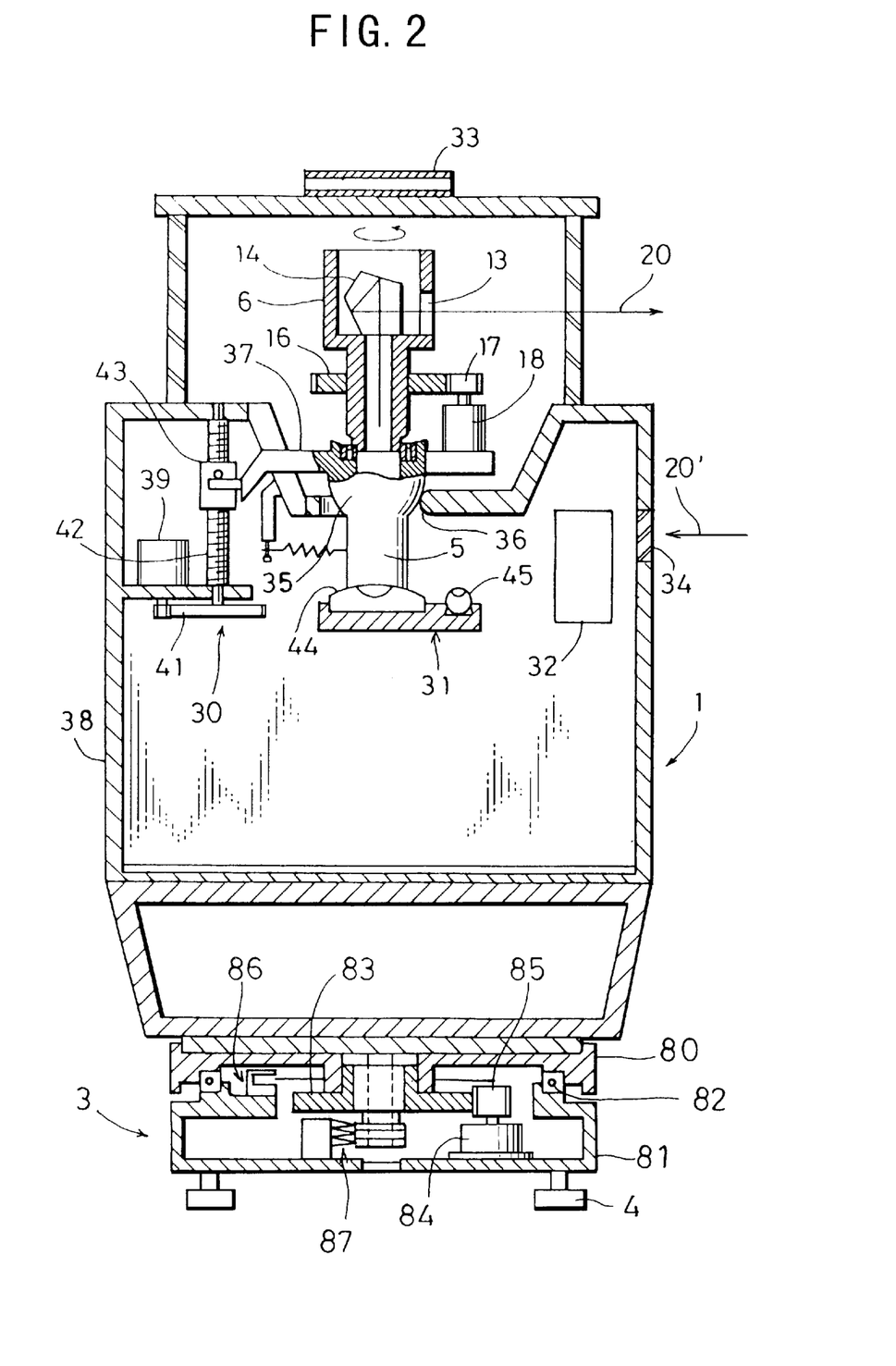
FIG. 2 is a cross-sectional view showing an essential portion of the embodiment of the present invention.
Figure 3:
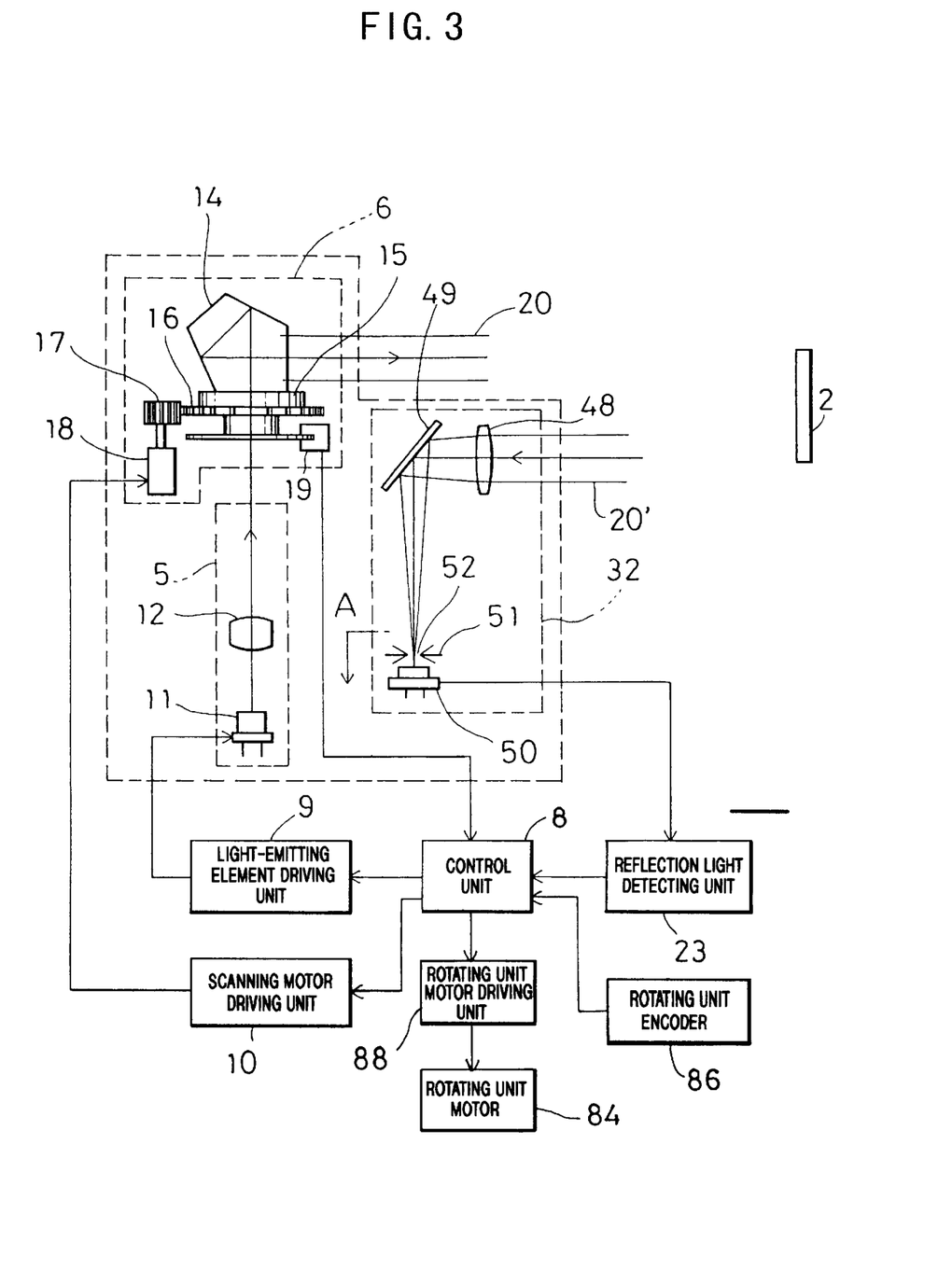
FIG. 3 is a block diagram of the above embodiment of the present invention.
Figure 13:
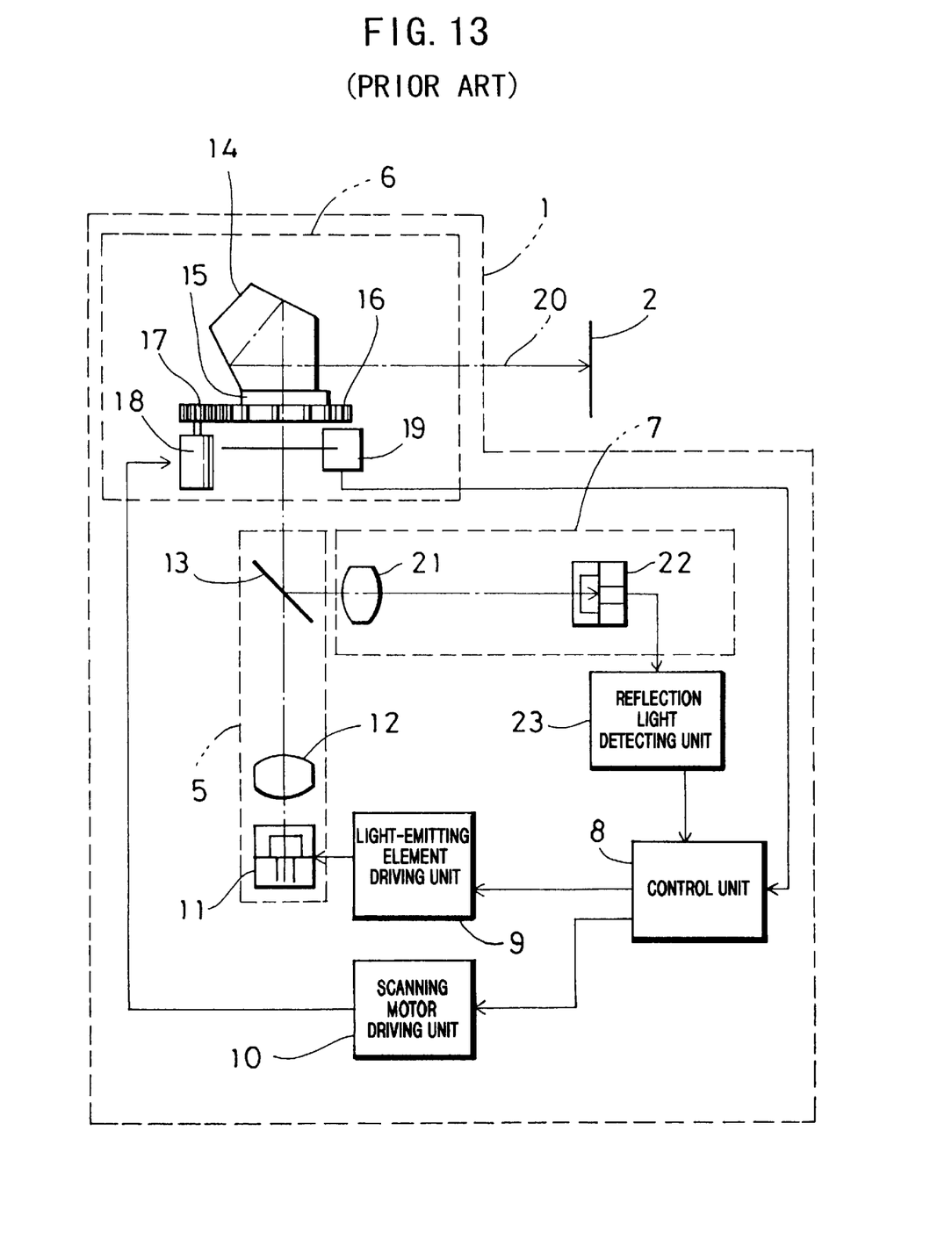
FIG. 13 is a block diagram of a conventional example.
Figure 14A:
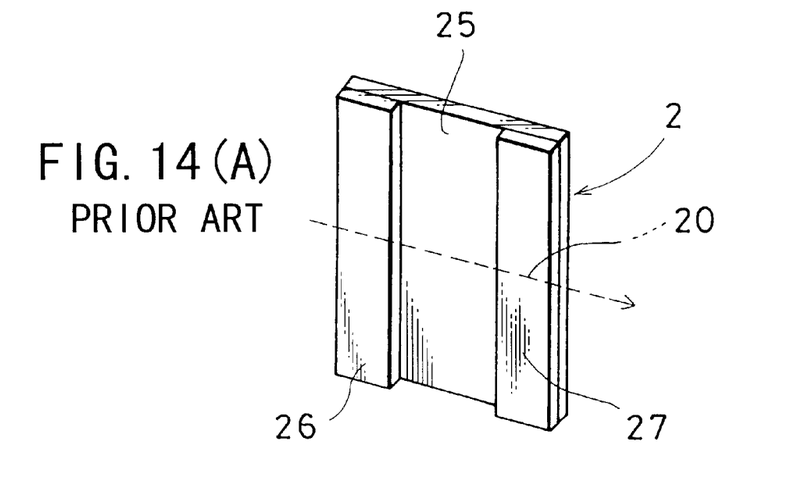
FIG. 14(A) is a perspective view of the target.
Figure 14B:
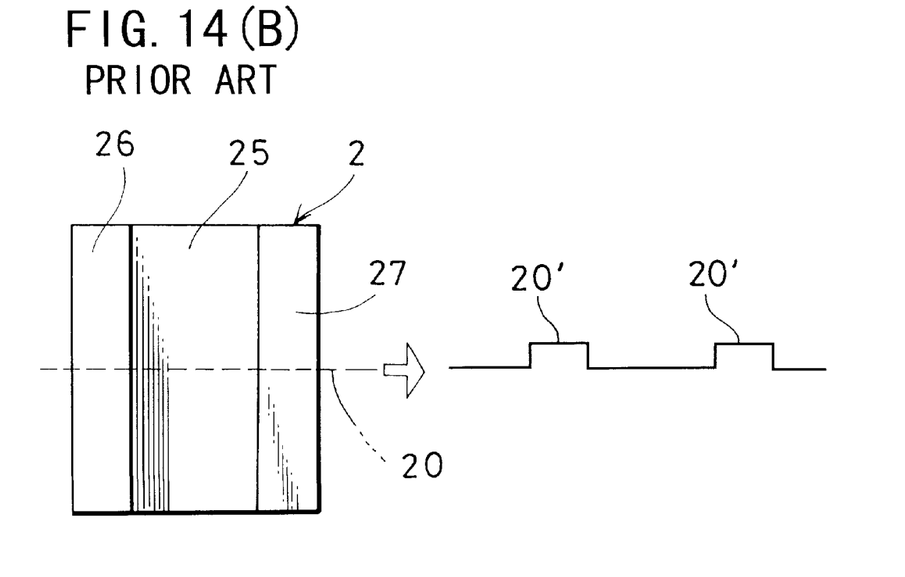
FIG. 14(B) is a drawing to explain the function of the target.

In FIG. 1 to FIG. 3, the same components as in FIG. 13 and FIG. 14 are referred by the same symbols.

A laser irradiation system comprises a rotary irradiation system main unit 1, a target 2, and a rotating unit 3, which rotates the rotary irradiation system main unit 1 around a vertical axis. The rotary irradiation system main unit 1 is installed on a tripod or the like (not shown) via the rotating unit 3. Further, the rotary irradiation system main unit 1 primarily comprises a light emitter 5 for emitting a laser beam 20, a rotator 6 for irradiating the laser beam by rotary irradiation within a reference plane, a tilt setting unit 30 for setting leveling and tilting of the reference plane of the rotary irradiation system main unit 1, a tilt detecting unit 31, and a photodetection unit 32.

On the top surface of the rotary irradiation system main unit 1, a collimator 33 is provided, and direction of the rotary irradiation system main unit 1 is roughly set with respect to a target 2 using the collimator 33. On the rotary irradiation system main unit 1, a photodetection window 34 is formed under the rotator 6. Reflection laser beam 20' reflected from the target 2 passes through the photodetection window 34 and is received by the photodetection unit 32 arranged in the rotary irradiation system main unit 1.

The rotating unit 3 is provided under the rotary irradiation system main unit 1, and it is mounted on a tripod (not shown) using leveling screws 4.

On the lower surface of the rotary irradiation system main unit 1, a rotation seat 80 is fixed, and the rotation seat 80 is rotatably mounted on a rotation base 81 via a bearing 82. A rotating unit driven gear 83 is fixed on the rotation seat 80. A rotating unit motor 84 is mounted on the rotation base 81, and a rotating unit driving gear 85 fitted to an output shaft of the rotating unit motor 84 is engaged with the rotating unit driven gear 83. A rotating unit encoder 86 is arranged between the rotation seat 80 and the rotation base 81. In the figure, reference numeral 87 represents a contact point to supply electric current from the rotary irradiation system main unit 1 to the rotating unit 3.

The light emitter 5 is tiltably supported by a spherical unit 35 and a receiving seat 36 (or gimbals). On the upper end of the light emitter 5, the rotator 6 is rotatably mounted, and a scanning gear 16 is fitted to the rotator 6. The scanning gear 16 is engaged with a driving gear 17 of a scanning motor 18 that is fixed on the light emitter 5. When the driving gear 17 is driven, the rotator 6 is rotated. Two tilting arms 37 (one of them is not shown) are extended horizontally from the light emitter 5. The two tilting arms cross perpendicularly each other and are connected to tilt setting units 30 (one of them is not shown) respectively as described later.

Description will be given now on the tilt setting unit 30.

A tilting motor 39 mounted on a casing 38 of the rotary irradiation system main unit 1 is connected to a tilt setting screw 42 via a gear train 41. A slide nut 43 is screwed on the tilt setting screw 42, and the slide nut 43 is engaged with tip of the tilting arm 37. By the two tilt setting units 30, it is possible to set tilting of the light emitter 5 in any direction as desired.

Tilt angle of the light emitter 5 is detected by the tilt detecting unit 31 arranged at the lower end of the light emitter 5. The tilt detecting unit 31 comprises two tilt sensors 44 and 45 crossing each other perpendicularly and a tilting rate calculating unit (not shown) for detecting tilting of the light emitter 5 based on output signals from the tilt sensors 44 and 45. Driving of the tilting motor 39 is controlled according to the output from the tilt detecting unit 31. Tilt setting can be achieved by driving the tilting motor 39 at an angle converted to number of pulsars.

The photodetection unit 32 may be fixed on the casing 38, or it is preferably mounted on the light emitter 5 and is designed as it is tiltable integrally with the light emitter 5. The photodetection unit 32 will be described below.

Figure 4:
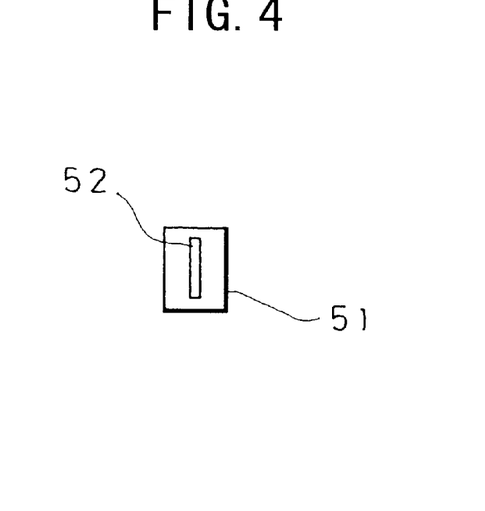
FIG. 4 is an arrow diagram seen along an arrow A in FIG. 3.

A condenser lens 48 is arranged at a position opposite to the photodetection window 34, and a reflection mirror 49 is placed on an optical axis of the condenser lens 48. The optical axis of the condenser lens 48 runs in parallel to a reference plane formed by rotation of the laser beam 20. A photodetection element 50 is arranged under the reflection mirror 49, and the reflection laser beam 20' is converged to the photodetection element 50. The photodetection element 50 is a line sensor being long in the scanning direction of the laser beam 20 (a direction running perpendicularly to the paper surface in FIG. 3), and a mask 51 is arranged in front of the photodetection element 50. The mask 51 interrupts incident noise light to the photodetection element 50, and a long slit 52 running longitudinally in the scanning direction of the reflection laser beam 20' is formed as shown in FIG. 4. Laser beam may be directly received by the photodetection element 50, and the reflection mirror 49 may not be used.

A photodetection signal from the photodetection element 50 is, inputted to a reflection light detecting unit 23, and laser beam reflecting condition at the target 2 as detected by the reflection light detecting unit 23 is inputted to a control unit 8. A signal from the rotating unit encoder 86 is inputted to the control unit 8. The control unit 8 drives the laser diode 11 via a light-emitting element driving unit 9, drives the scanning motor 18 via a scanning motor driving unit 10, and drives a rotating unit motor 84 via a rotating unit motor driving unit 88.

Based on signals from the photodetection unit 32 or from the tilt sensors 44 and 45, the encoder 19, and the rotating unit encoder 86, the control unit 8 displays information relating to direction of the rotary irradiation system main unit 1 and to the reference plane formed by the laser beam 20 on a display unit (not shown) of the rotary irradiation system main unit 1. For example, information to be displayed is as follows: display of alignment under the condition where the rotary irradiation system main unit 1 is accurately facing to the target 2 or information as to in which direction or at what angle the rotary irradiation system main unit 1 is rotating with respect to the target 2, or tilt angle or tilting direction of the reference plane.

The target 2 used in the present embodiment is the same as the one already described, and detailed description is not given here.

In the following, description will be given on the operation of the system.

The target 2 is installed at a predetermined reference position, and rough leveling is performed using the leveling screws 4. Then, the rotary irradiation system main unit 1 is leveled using the tilt setting unit 30 and the tilt detecting unit 31, and the rotary irradiation system main unit 1 is further driven.

The laser diode 11 is driven via the light-emitting element driving unit 9, and the laser beam 20 is emitted from the laser diode 11. The laser beam 20 is turned to parallel beams having a predetermined light beam diameter by a collimator lens 12. The beams are reflected in a horizontal direction by a pentagonal prism 14 and are irradiated to the predetermined reference plane. The pentagonal prism 14 is rotated by the scanning motor 18 via the driving gear 17, the scanning gear 16, and the rotation support 15. By rotation of the pentagonal prism 14, the laser beam 20 is irradiated by rotary irradiation, and a reference plane is formed.

The target 2 is placed on the reference line, and the laser beam 20 scans across the target 2. The laser beam 20 scans across the reflection layers 26 and 27, and the reflection laser beam 20' is reflected in pulse-like manner by the two reflection layers 26 and 27 as shown in FIG. 14 (B). As described above, the laser beam 20 has a predetermined light beam diameter, and the reflection laser beam 20' passes through the photodetection window 34 and enters the photodetection unit 32.

The reflection laser beam 20' passes through the condenser lens 48 and is reflected by the reflection mirror 49 toward the photodetection element 50 and is converged to the photodetection element 50. The mask 51 interrupts noise light which enters the photodetection element 50, and this increases photodetection accuracy of the photodetection element 50. The photodetection unit 32 is fixed, and the pentagonal prism 14 is rotated. As described above, the photodetection element 50 is a line sensor, which is designed long in the scanning direction of the reflection laser beam 20'. Because the slit 52 is also designed long in the scanning direction of the reflection laser beam 20', the photodetection unit 32 can detect the reflection laser beam 20' within the range of a predetermined angle.

The photodetection signal from the photodetection element 50 is inputted to the reflection light detecting unit 23, and the reflection light detecting unit 23 detects position of the target 2 and the central position of the target 2 based on the signals from the photodetection element 50. The target 2 reflects the reflection laser beam 20' in form of two pulses, and the photodetection unit 32 can accurately detect the target 2. Further, a point at the middle of two pulses of the reflection laser beam 20' is the center of the target 2, and the photodetection unit 32 can also detect the center of the target 2.

The detection result of the target 2 by the reflection light detecting unit 23 is inputted to the control unit 8. Based on the signal from the reflection light detection unit 23 and the signal from the encoder 19, the control unit 8 drives the scanning motor 18 via the scanning motor driving unit 10 and controls a position and rotation of the pentagonal prism 14. The laser beam 20 is controlled in such manner that it is irradiated by point irradiation to the target 2 or by reciprocal scanning across the center of the target 2 within a predetermined width.

As the method to detect the target 2, in addition to the method to detect by rotary scanning of the laser beam by rotating the rotator 6, there is a method to reciprocally rotate the rotator 6 within a predetermined angle, and while performing reciprocal scanning of the laser beam within a predetermined angle, the rotating unit motor 84 of the rotating unit 3 may be driven to rotate the rotary irradiation system main unit 1.

In the present embodiment, the light receiving system of the reflection laser beam 20' is provided separately from the light projecting system of the laser beam 20. As a result, it is possible to extensively select beam diameter of the laser beam 20 without being limited by the shape of the pentagonal prism 14 and to increase photodetection amount (light quantity) to be detected by the photodetection unit 32. This makes it possible to increase the reaching distance of the laser beam 20 up to the target 2.

Next, description will be given on tilt setting.

When the laser beam is irradiated by rotary irradiation and the target 2 is detected, rotating angle of the rotator 6 at the time of detection is detected by the encoder 19, and the direction of the rotary irradiation system main unit 1 is detected by the rotating unit encoder 86. The control unit 3 calculates deviation between the encoder 19 and the rotating unit encoder 86. Based on the deviation, angular displacement of the rotary irradiation system main unit 1 with respect to the target 2 is detected. Based on this angular displacement, the rotation unit motor driving unit 88 is driven. The rotation unit motor driving unit 88 drives the rotating unit motor 84 so that the angular displacement will he eliminated and the rotary irradiation system main unit 1 is rotated. The amount of rotation is detected by the rotating unit encoder 86, and when the rotary irradiation system main unit 1 is accurately faced toward the target 2, the tilt setting unit 30 and the tilt detecting unit 31 are driven, and the light emitter 5 and the rotator 6 are tilted at a predetermined angle.

To perform the tilt setting by the tilt setting unit 30, the tilting motor 39 is driven by pulse driving, and the tilting motor 39 is rotated at the number of pulses corresponding to the tilt angle to be set.

After tilt setting has been completed, the rotator 6 is rotated, and a tilt reference plane tilted at a predetermined angle in a predetermined direction is formed by the laser beam. Or, reciprocal scanning is performed at a predetermined angle around the target 2.

Also, the reference plane of the laser beam can be tilted in any direction as desired. After the rotary irradiation system main unit 1 is accurately positioned face-to-face to the target 2, the rotating unit motor 84 is driven, and when it is rotated at 90°, for example, a reference plane of the laser beam tilted toward a direction perpendicular to the direction of the target 2 can be formed.

As described above, the collimator 33 is used in case the rotary irradiation system main unit 1 is roughly set to a predetermined direction or in case the rotating unit 3 is not normally operated. Further, it is used to set the direction of the laser irradiation system that is not equipped with the rotating unit 3.

To set the direction of the laser irradiation system which is not equipped with the rotating unit 3, the rotary irradiation system main unit 1 is installed on a rotation base such as a tripod, and the direction is roughly aligned using a collimator after leveling operation. Next, the rotator 6 is rotated and the laser beam is irradiated by rotary irradiation, and the target 2 is detected. By the detection of the target 2, deviation or error of the direction between the rotary irradiation system main unit 1 and the target 2 is calculated, and the corrected direction and the corrected angle are displayed on a display unit (not shown) of the rotary irradiation system main unit 1. Operator rotates the rotary irradiation system main unit 1 according to the display and corrects the direction and confirms that correspondence is displayed on the display unit.

When the setting of the direction of the rotary irradiation system main unit 1, i.e. the setting of tilting direction, has been completed, the setting of tilt angle is performed.

Figure 5:
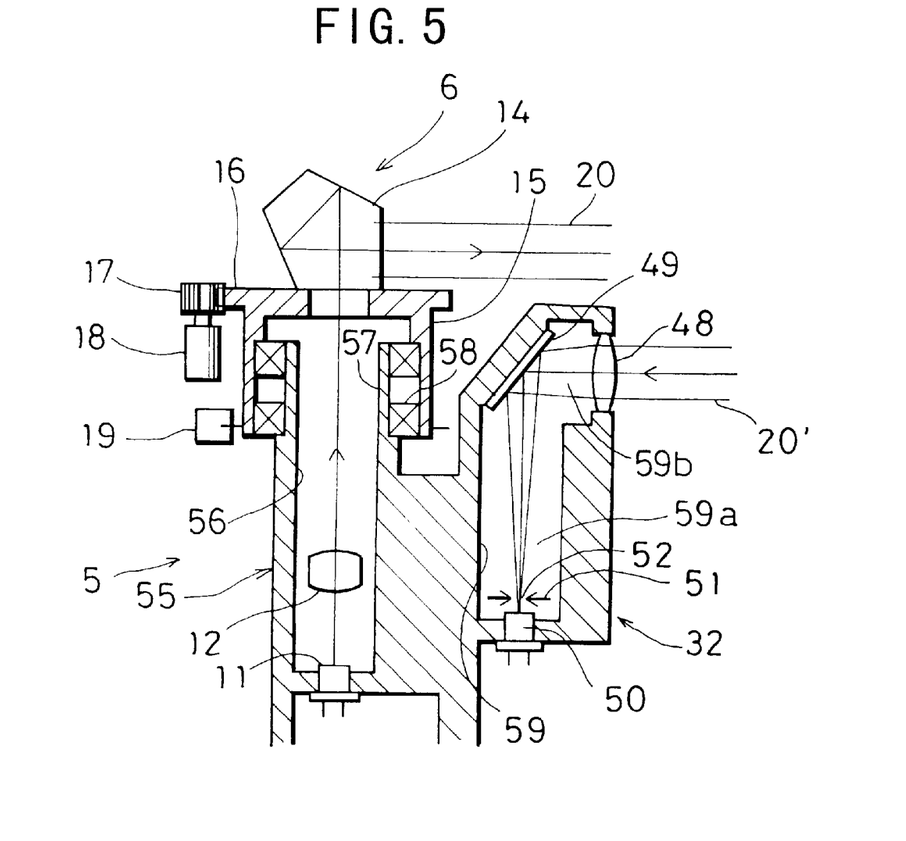
FIG. 5 is a cross-sectional view showing a structure of an essential portion of the above embodiment of the invention.

Referring to FIG. 5, description will be given now on concrete arrangement where the light emitter 5 and the photodetection element 50 are integrally and tiltably provided.

On a tilting block 55, a light projection lens-barrel 56 running in a vertical direction is arranged. The laser diode 11 is placed at the bottom of the light projection lens-barrel 56, and the collimator lens 12 is arranged on an optical axis of the laser diode 11. The upper end of the light projection lens-barrel 56 is designed as a hollow shaft 57, and the rotation support 15 is rotatably mounted on the shaft 57 via a bearing 58. Around the upper end of the rotation support 15, the scanning gear 16 is arranged, and the driving gear 17 of the scanning motor 18 is engaged with the scanning gear 16. On the lower end of the rotation support 15, the encoder 19 is mounted.

On the tilting block 55, a hook-shaped photodetection lens-barrel 59 is mounted, which comprises a vertical lens-barrel 59a in parallel to the light projection lens-barrel 56 and a horizontal lens-barrel 59b which is continuous to the upper end of the vertical lens-barrel 59a. The condenser lens 48 is mounted on an open end of the horizontal lens-barrel 59b, and the photodetection element 50 is arranged at the bottom of the vertical lens-barrel 59a. At the corner defined by the vertical lens-barrel 59a and the horizontal lens-barrel 59b, the reflection mirror 49 is mounted, and the mask 51 is arranged to cover the photodetection surface of the photodetection element 50. As described above, the slit 52 formed on the photodetection element 50 and the mask 51 is designed as being long in the scanning direction of the reflection laser beam 20' (a direction perpendicular to the paper surface).

In FIG. 5, the light emitter 5 and the photodetection unit 32 are designed as an integrated structure and are tilted at the same time. If the photodetection unit 32 is designed integrally with the rotation support 15 as seen in FIG. 5, the photodetection unit 32 is integrally rotated and tilted with the rotator 6. In this case, the photodetection element 50 is not necessarily to be a line sensor, and the slit 52 of the mask 51 may be designed as a round hole.

Next, description will be given on a second embodiment of the present invention referring to FIG. 6 to FIG. 9.

Figure 6:
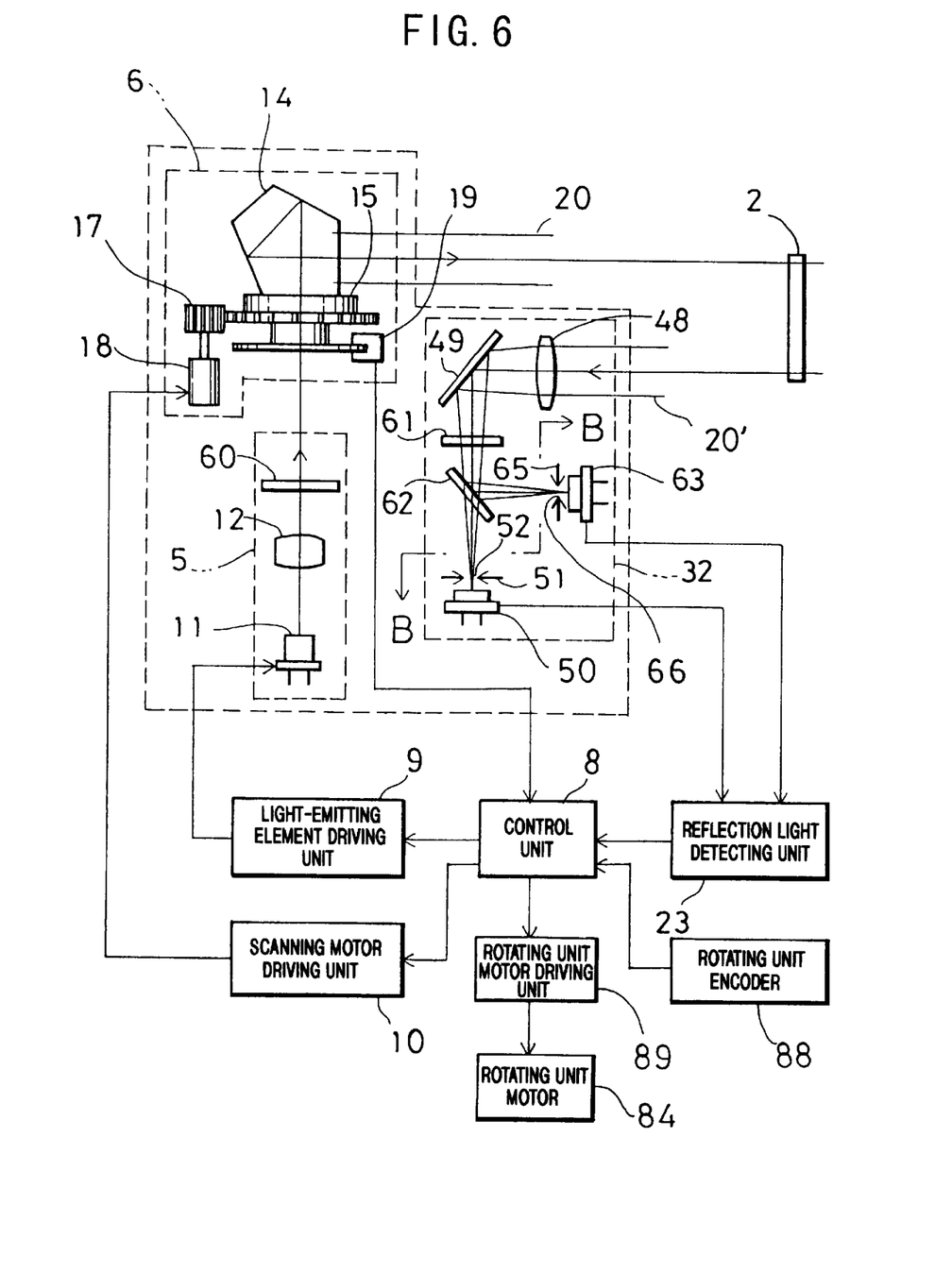
FIG. 6 is a block diagram of a second embodiment of the present invention.

In FIG. 6, the same components as in FIG. 3 are referred by the same symbols, and detailed description is not given here.

In this embodiment, the laser beam to be irradiated is a polarized laser beam 20 to improve photodetection accuracy and to make the center of the target 2 more accurately detectable.

The laser diode 11 of the light emitter 5 emits a linearly polarized laser beam. At a position between the collimator lens 12 and the pentagonal prism 14, a light projection λ/4 birefringence member 60 is arranged. As a result, the laser beam passing through the collimator lens 12 by rotary scanning is turned to a circularly polarized laser beam 20. Because the laser emitting direction and photodetection direction are already determined, it may be turned to a linearly polarized beam by adjusting the polarizing direction.

On the optical axis of the collimator lens 12 of the light emitter 5 and on the pentagonal prism 14 side, the light projection λ/4 birefringence member 60 is arranged. A photodetection λ/4 birefringence member 61 is arranged on the reflection side of the reflection mirror 49 of the photodetection unit 32. Further, a polarization beam splitter 62 is placed between the photodetection λ/4 birefringence member 61 and the photodetection element 50. The polarization beam splitter 62 allows the reflection laser beam 20' to pass which has polarization plane of the same direction as the polarized laser beam 20, while it reflects the reflection laser beam 20' having polarization plane changed by 90° from that of the polarized laser beam 20. The reflection laser beam 20' passing through the polarization beam splitter 62 is converged to the photodetection element 50, and the reflection laser beam 20' reflected by the polarization beam splitter 62 is converged to the photodetection element 63.

Figure 7:
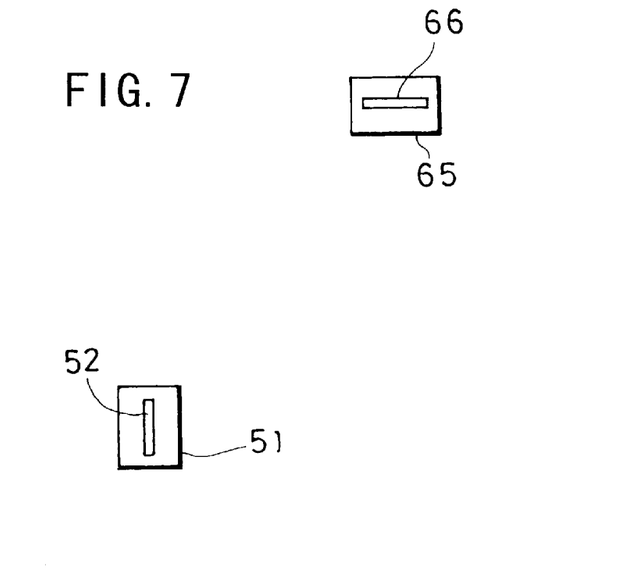
FIG. 7 is an arrow diagram along the line B—B in FIG. 6.

Like the photodetection element 50, the photodetection element 63 is a line sensor, which is long in the scanning direction of the reflection laser beam 20' (a direction perpendicular to the paper surface in FIG. 6), and a mask 65 is arranged in front of the photodetection element 63. The mask 65 interrupts incident noise light to the in photodetection element 63, and as shown in FIG. 7, a slit 66 is formed which is long in the scanning direction of the reflection laser beam 20' (a direction perpendicular to the paper surface in FIG. 6).

Photodetection signals from the photodetection elements 50 and 63 are inputted to the reflection light detection unit 23.

Figure 8:
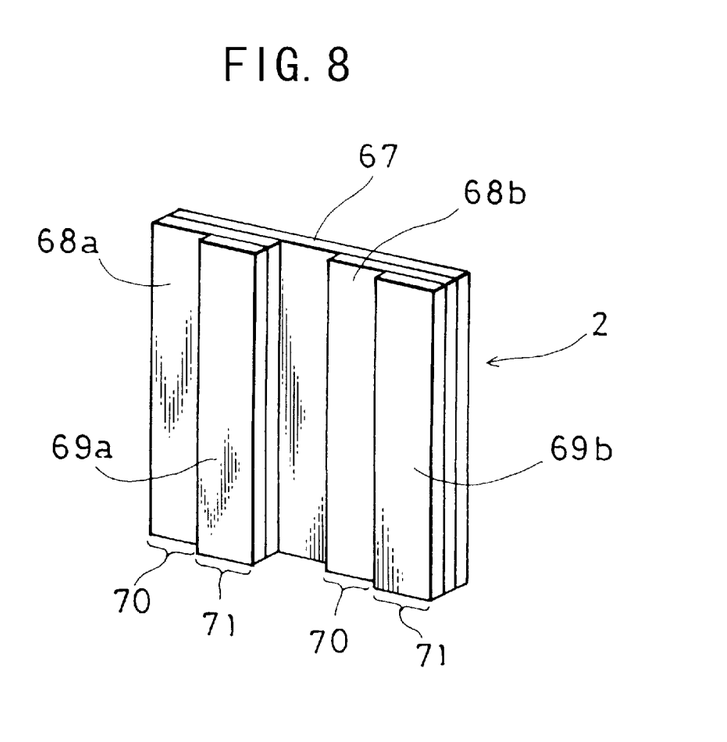
FIG. 8 is a perspective view of a target used in the present embodiment.

FIG. 8, FIG. 9(A) and FIG. 9(B) each represents the target 2 used in the second embodiment.

Referring to FIG. 8, FIG. 9(A) and FIG. 9(B), other examples of the target 2 will be described. In the target 2, reflection layers 68a and 68b each designed in tablet shape are arranged at the left and the right of a base plate 67 respectively so that the central portion of the base plate 67 is exposed in shape of a tablet. On the right half portion of each of the reflection layers 68a and 68b, λ/4 birefringence members 69a and 69b are mounted respectively. The exposed portion of each of the reflection layers 68a and 68b is a polarization maintaining reflection sector 70 which reflects the laser beam while maintaining the polarization direction of the laser beam. The portion of each of the reflection layers where the λ/4 birefringence members 69a and 69b are attached respectively is a polarization converting reflection sector 71, which reflects the laser beam while converting the polarization direction of the laser beam. Two sets of combined reflection sectors are provided, each of which comprises a combination of the polarization maintaining reflection sector 70 and the polarization converting reflection sector 71. The reflection layers 68a and 68b may be arranged on the base plate 67 in such manner that not only the central portion of the base plate 67 but also peripheral portions may be exposed. Further, there may be 3 sets or more of the combined reflection sectors.

When the circularly polarized laser beam 20 is irradiated for scanning as shown in FIG. 9(A) and it passes through the reflection layer 68a, the laser beam 20 having polarization plane maintained as before is reflected. When the laser beam passes through the λ/4 birefringence member 69a, circularly polarized laser beam having polarization plane changed by λ/4 is reflected. When the laser beam passes through the exposed portion of the base plate 67, the laser beam 20 is not reflected. Further, when laser beam passes through the reflection layer 68b, the laser beam 20 is reflected while maintaining the polarization plane. When the laser beam passes through the λ/4 birefringence member 69b, circularly polarized laser beam with polarization plane changed by λ/4 is reflected.

For example, the reflection laser beam 20' reflected by the reflection layer 68a enters the photodetection unit 32 and passes through the photodetection λ/4 birefringence member 61. In this case, the reflection laser beam 20' is turned to a linearly polarized light which has polarization plane of the same direction as the laser beam 20. Then, it passes through the polarization beam splitter 62 and enters the photodetection element 50. Because it is not reflected by the polarization beam splitter 62, it does not enter the photodetection element 63. Therefore, photodetection signal is outputted only from the photodetection element 50.

Next, the reflection laser beam 20' reflected by the reflection layer 69a enters the photodetection unit 32 and passes through the photodetection λ/4 birefringence member 61. In this case, the reflection laser beam 20' is turned to a linearly polarized light with polarization plane having a direction changed by 90° from that of the laser beam 20. The polarization beam splitter 62 reflects the reflection laser beam 20' and does not allow it to pass. Therefore, the photodetection element 63 receives the reflection laser beam 20', while the photodetection element 50 does not receive the reflection laser beam 20. Photodetection signal only from the photodetection element 63 is outputted to the reflection light detecting unit 23. Further, in case the laser beam 20 passes through the exposed portion of the base plate 67, the laser beam 20 is not reflected, and both the photodetection element 50 and the photodetection element 63 do not receive the reflection laser beam 20'.

When the difference between the photodetection signals from the photodetection elements 50 and 63 inputted to the reflection light detecting unit 23 is calculated in case the laser beam 20 scans across the target 2, it is as shown in FIG. 9(B), and two types of signals having positive or negative signs reversed and clearly divided on non-reflection sector are obtained. By detecting the signals when positive or negative sign is reversed, it is possible to eliminate the ambiguous rise-up of the signal and to recognize accurately and reliably that it is a reflection light beam from the target 2. Because the time difference t1 between the positive and negative reversed signals is specific to the target 2, it is possible to accurately confirm the target 2 by detecting the time difference t1. Therefore, even in case there is unnecessary reflection light coming from laminated glass and the like, no erroneous operation occurs.

FIG. 10(A) and FIG. 10(B) each represents another type of the target 2. In this case, a rectangular reflection layer 68 is divided into two parts along a diagonal line, and a λ/4 birefringence member 69 is attached on the surface of one of the divided parts. In this case again, a signal corresponding to a line segment on the reflection layer 68, which the laser beam 20 runs across, is outputted from the photodetection element 50, and a signal corresponding to a line segment on the λ/4 birefringence member 69, which the laser beam 20 runs across, is outputted from the photodetection element 63. By obtaining a difference between the signal from the photodetection element 50 and the signal from the photodetection element 63, it is possible to obtain the signal shown in FIG. 10(B). The values t2 and t3 of photodetection time are proportional to the above line segments respectively, and a point where these two line segments become equal to each other is identified as the center of the target 2. Therefore, by detecting the photodetection time when t2=t3, it is possible to detect the center of the target 2.

Figure 10:
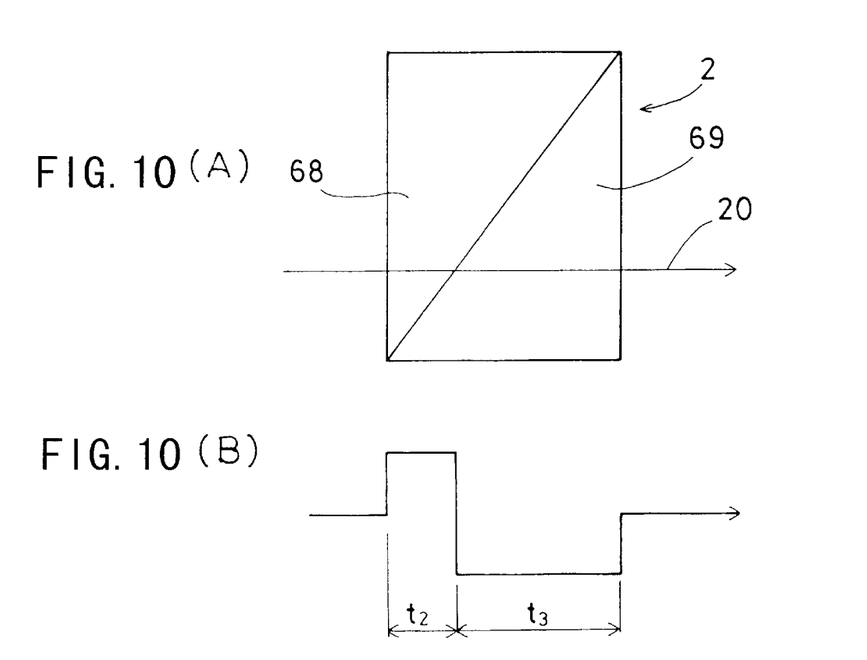
FIG. 10(A) and FIG. 10(B) each represents a drawing to explain the function of the target used in the present embodiment.

In case the target 2 as shown in FIG. 10 is used, it is possible to automatically set the tilt angle.

The target 2 is scanned by rotary scanning or reciprocal scanning, and the tilt setting unit 30 is operated until the center of the target 2 can be detected from the output of the photodetection unit. While scanning the target 2 by rotary scanning or reciprocal scanning of the laser beam, the tilt setting unit 30 is operated, and the light emitter 5 and the rotator 6 are tilted until the center of the target 2 is detected from the output of the photodetection unit 32. After the center of the target has been detected, the rotator 6 is rotated or reciprocally rotated at a predetermined angle, and a laser plane is formed.

Figure 11:
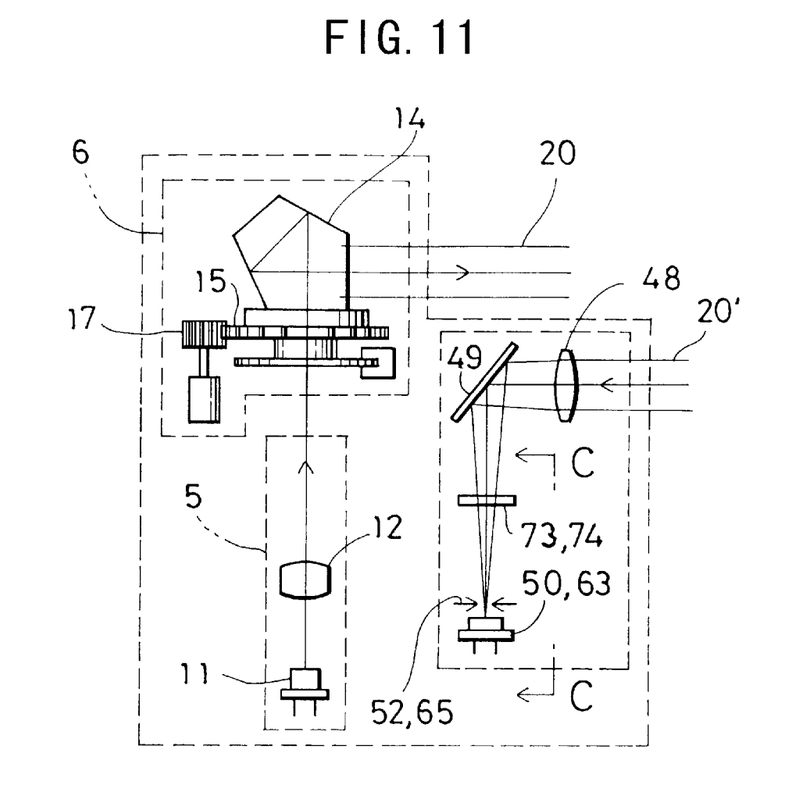
FIG. 11 is a block diagram of an essential portion of a third embodiment of the present invention.
Figure 12:
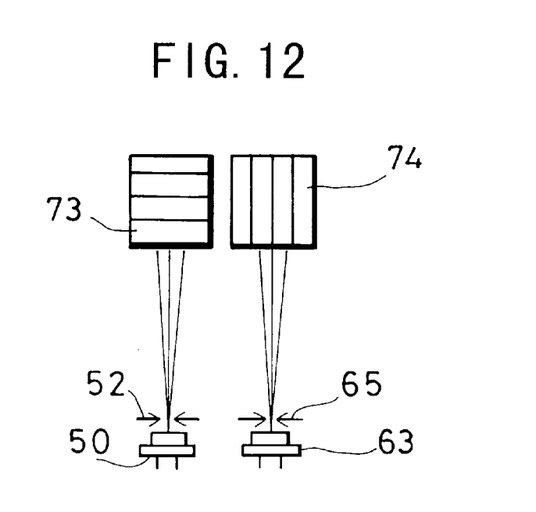
FIG. 12 is an arrow diagram along the line C—C in FIG. 11.

In a third embodiment of the invention as shown in FIG. 11, a linearly polarized laser beam 20 is irradiated from the pentagonal prism 14, and the target 2 used in this case is as shown in FIG. 8 and FIG. 10.

In FIG. 11, the same components as in FIG. 3 are referred by the same symbols, and detailed description is not given here.

Along the scanning direction of the laser beam 20 (a direction perpendicular to the paper surface), photodetection elements 50 and 63 are arranged. A polarizing plate 73 is placed between the reflection mirror 49 and the photodetection element 50, and a polarizing plate 74 is placed between the reflection mirror 49 and the photodetection element 63. The polarizing plate 74 and the polarizing plate 73 have the polarization planes changed by 90° from each other, and it is designed in such manner that the polarizing plate 73 allows the laser beam to pass, which has the same polarization plane as that of the laser beam 20.

The reflection laser beam 20' reflected by the reflection layer 68, i.e. reflected by the polarization maintaining reflection sector 70, passes through the polarizing plate 73, while it is interrupted by the polarizing plate 74. The reflection laser beam 20' reflected by the polarization converting reflection sector 71 is interrupted by the polarizing plate 73 while it passes through the polarizing plate 74. Therefore, the reflection laser beam 20' reflected by the polarization maintaining reflection sector 70 is received only by the photodetection element 50, and the reflection laser beam 20' reflected by the polarization converting reflection sector 71 is received only by the photodetection element 63.

Figure 9:
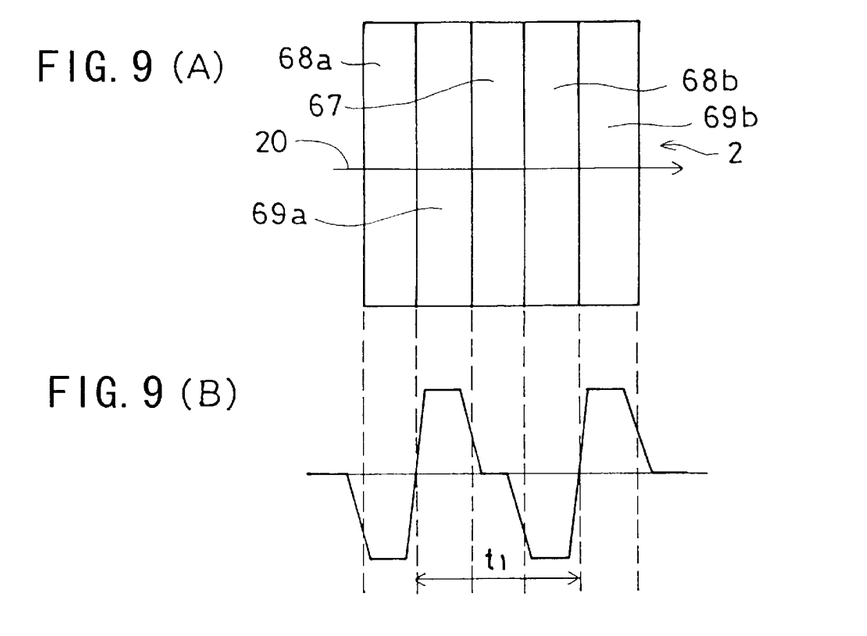

By calculating the difference between the signals from the photodetection elements 50 and 63, it is also possible in the present embodiment to obtain the signal shown in FIG. 9 and FIG. 10.

As described above, irradiation optical system and photodetection system are separated from each other in the present invention, and the optical system of the photodetection unit is not limited by the optical system of light projection, and it is possible to increase light beam diameter of the irradiated laser beam, to increase amount of photodetection (light quantity), to have longer projection distance of the laser beam, and to obtain various superb effects such as the formation of a reference plane for laser beam irradiation in wider range.

What is claimed are:

1. A laser irradiation system, comprising a laser light emitter for emitting a laser beam, a rotator for irradiating the laser beam from said laser light emitter by rotary irradiation and for forming a laser plane, a tilt setting unit for tilting said rotator and said laser plane, a photodetection unit integrated with said tilt setting unit for receiving a reflection laser beam reflected from a target which reflects the laser beam from said rotator as a reflection laser beam, wherein said photodetection unit comprises a photodetection element that is at least longer in a dimension along a scanning direction than its dimension perpendicular to said scanning direction.

2. A laser irradiation system according to claim 1, wherein there is provided a mask for limiting photodetection range on photodetection optical path of said reflection laser beam.

3. A laser irradiation system according to claim 1, wherein said laser light emitter emits a polarized laser beam, said target comprises a polarization maintaining reflection sector for reflecting the laser beam while maintaining polarization direction and a polarization converting reflection sector for reflecting the laser beam while converting polarization direction, and said photodetection unit further comprises first photodetection means for receiving a reflection laser beam with polarization direction maintained as before and second photodetection means for receiving a reflection laser beam with polarization direction converted.

4. A laser irradiation system according to claim 1, wherein there is provided a rotating unit for rotating at least said tilt setting unit and said photodetection unit.

5. A laser irradiation system according to claim 4, wherein there is provided control means for controlling rotation of the rotating unit in such manner that tilting direction of said tilt setting unit corresponds with tilting direction of said target based on photodetection result of said photodetection unit.

6. A laser irradiation system according to claim 1, wherein there is provided display means for displaying correspondence in case setting direction of said tilt setting unit corresponds with the direction of said target based on photodetection result of said photodetection unit.

7. A laser irradiation system according to claim 1, wherein there is provided control means for controlling said tilt setting unit so that the laser beam is directed toward the center of said target based on photodetection result of said photodetection unit.

8. A laser irradiation system according to claim 3, wherein said photodetection unit comprises a polarization beam splitter, a first photodetection element for receiving one of the reflection laser beams split by said polarization beam splitter, and a second photodetection element for receiving the other of the split reflection laser beams.

9. A laser irradiation system according to claim 3, wherein said photodetection unit comprises a first polarizing plate, a second polarizing plate having polarization plane changed by 90° from said first polarizing plate, a first photodetection element for receiving the reflection laser beam passing through said first polarizing plate, and a second photodetection element for receiving the reflection laser beam passing through said second polarizing plate.

* * * * *